INVENTOR.
LORNE M. ROBINSON
BY
ATTORNEY

*INVENTOR.*
LORNE M. ROBINSON
*BY*
ATTORNEY

INVENTOR.
LORNE M. ROBINSON

BY [signature]

ATTORNEY

PHASE-LOCK RECEIVERS

Filed April 19, 1961 4 Sheets-Sheet 4

*INVENTOR.*
LORNE M. ROBINSON
*BY*
ATTORNEY

United States Patent Office 3,204,185

Patented Aug. 31, 1965

3,204,185

PHASE-LOCK RECEIVERS

Lorne M. Robinson, Garden Grove, Calif., assignor to North American Aviation, Inc.

Filed Apr. 19, 1961, Ser. No. 104,172

16 Claims. (Cl. 325—419)

This invention relates to phase-lock receivers and, more particularly, to devices for improving the performance of phase-lock receivers with respect to such things as: phase range within which the receiver will maintain its so-called "lock" with the input signal; the range of linear feedback control of the variable frequency oscillator which is used to develop a signal related to the phase error; or the probability of locking on the input signal.

The design and performance of the typical phase-lock receiver is discussed in an article by R. Jaffee and E. Rechtin on page 66 of the March 1955, issue of the IRE Transactions on Information Theory. In FIG. 1 of this article, a typical phase-lock loop is shown wherein a multiplier, referenced as X, receives an input signal which may be an FM or PM carrier, and also receives the output signal of the voltage-controlled oscillator VCO. The multiplier or mixer X (which may also be referred to as a balanced modulator) produces an output signal proportional to the phase difference between the two input signals, which is applied to a Loop Filter, providing the voltage control for oscillator VCO.

The general operation and design theory of the typical phase-lock loop is discussed in the above-referenced article. At the outset, it is pointed out that the loop filter output is a function of the phase difference between the oscillator and the input signal. This phase difference signal is then applied to the VCO oscillator to force its frequency and phase to follow that of the input signal. In the discussion which follows, reference to phase difference will be concerned with the difference between the phase of the input signal, which is referred to herein as $\theta$, and the phase of the feedback signal, which is referred to herein as $\phi$. Both $\theta$ and $\phi$ are functions of time and could be expressed as $\theta(t)$ and $\phi(t)$, respectively, but will be referred to simply as $\theta$ and $\phi$ hereinafter.

It has been established that the conventional phase-lock receiver of the type mentioned above will lose the input signal, or fall out of phase lock therewith, when the difference between the input and feedback phases becomes greater than $\pm 90°$. It has also been established that as the instantaneous phase difference approaches 90°, the feed-back voltage applied to oscillator VCO tends to decerase per degree of phase difference. Thus, instead deriving an increased correction voltage to drive the feedback phase into lock with the input signal, the conventional technique tends to instability as the 90° phase difference area is approached.

The conventional phase-lock system is also limited with respect to the range of linearity of feedback with the usual sinusoidal control function which is employed and thus must operate within a rather limited phase difference range to insure at least a fifty percent probability of locking on the input signal.

The above disadvantages and limitations of the conventional phase-lock receiver are obviated according to the invention by modifying the sinusoidal feedback function through a novel translation circuit. Although many modifications are possible within the broad concept of the invention, the initial detailed description herein will be directed to the transformation into a tangent function. In this case, the sinusoidal function Sin $(\theta-\phi)$ derived through the Loop Filter is shifted in phase by 90° to generate the corresponding function Cos $(\theta-\phi)$. An input voltage representing the relative value 1 is then added to the cosine function, and the sine function is then divided by the augmented cosine function to provide the function:

$$f(Ec, Ee)=\text{Sin }(\theta-\theta)/[1+\text{Cos }(\theta-\phi)]$$

where Ec, represents the signal Sin $(\theta-\phi)$ or, in the general case, the output signal of the Loop Filter; and Ee represents the augmenting input signal combined with the cosine, which is a voltage representing the value 1 in this case.

The tangent function can, of course, be obtained from the equivalent function:

$$f(Ec, Ee)=[1-\text{Cos }(\theta-\phi)]/\text{Sin }(\theta-\phi)$$

In the generic sense then the invention contemplates the introduction of the translation function:

$$f(Ec, Ee)=A\text{ Sin }(\theta-\phi)/[B+D.\text{ Cos }(\theta-\phi)]$$

$$f(Ec, Ee)=[F-G.\text{ Cos }(\theta-\phi)]/H.\text{ Sin }(\theta-\phi)$$

The constants A, B, D, F, G and H are selected to provide the optimum linear range and loop stability. The general technique for this selection is discussed below.

Accordingly, it is a general object of the present invention to provide an improved phase-lock receiver system.

Another object is to extend the linear feedback control region for the phase-locking loop of a receiver system.

A further object is to increase the probability of lock in a phase-lock receiver system.

Still another object is to provide for increasing correctional feedback in a phase-lock system as the phase difference approaches the locking limits.

Yet a further object is to increase the locking range of a phase-lock receiver system.

A specific object is to improve over the conventional phase-lock system by translating the usual sinusoidal feedback therein into a modified function, such as a tangent, which permits locking in a region ideally in the order $\pm 180°$.

The novel features which are believed to be characteristic of the invention, both as to its organization and method of operation, together with further objects of the invention, will be better understood from the following description considered in connection with the accompanying drawings in which several embodiments of the invention are illustrated by way of examples. It is to be expressly understood, however, that the drawings are for the purpose of illustration and description only and are not intended as definition of the limits of the invention.

Figure 1:
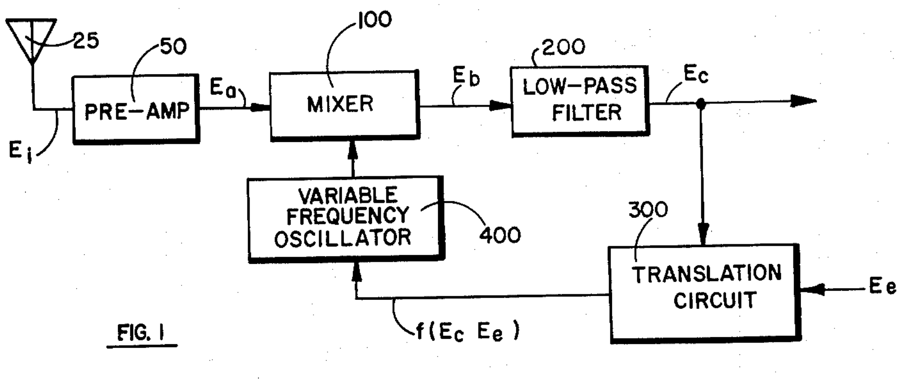
FIG. 1 is a block diagram illustrating the general form of a system incorporating the invention.

Reference is now made to FIG. 1 where a system incorporating the present invention is illustrated in block diagram form. As indicated in FIG. 1 a carrier E*i* modulated in frequency, phase or amplitude is received by antenna 25 and is passed through a pre-amplifier stage 50 producing a modulated carrier signal referenced as E*a*. Signal E*a* is applied to a multiplier, mixer or modulator stage 100. Stage 100 also receives the output signal of a variable frequency oscillator 400 and produces an output signal E*b* which is applied to low-pass or loop filter circuit 200 which produces output signal E*c*. Signal E*c* is the low-frequency component of signal E*b*, proportional to the sine of the phase difference between E$a$ and the output of stage 400, and is then applied to translation circuit 300 which constitutes the novel feature of the invention.

Circuit 300 also receives a fixed value input signal E$e$ which is combined with input signal E$c$ by circuit 300 to produce an output function signal, represented as $f(Ec,Ee)$ mentioned above. Signal function $f(Ec,Ee)$ is then employed to adjust the frequency and/or phase of variable frequency oscillator 400. It will be understood, of course, that if a pure phase-modulation system is involved, oscillator 400 may be adjusted directly in phase without modification of frequency by introducing a phase shift function. Therefore the term variable frequency as employed herein signifies any adjustment whether in phase or frequency which is required to lock with the input signal E$i$.

Figure 2:
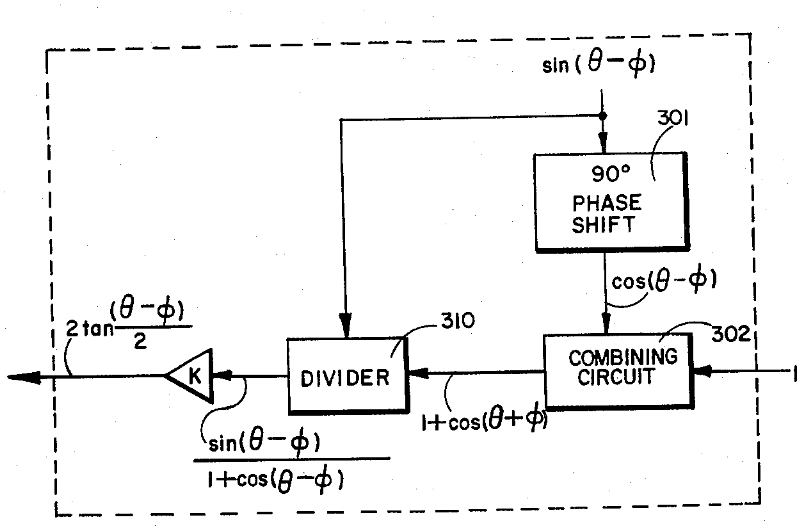
FIG. 2 is a block diagram illustrating one suitable arrangement of translation circuit 300 of FIG. 1.

One specific form for translation circuit 300 is illustrated in FIG. 2. In this case, the translation function modifies the usual sinusoidal feedback term Sin $(\theta-\phi)$ to develop a feedback signal $$f(Ec, Ee)=2 \text{ Tan} \left(\frac{\theta-\phi}{2}\right)$$

In the particular illustration of FIG. 2, this is accomplished by shifting the phase of Sin $(\theta-\phi)$ by 90° to produce Cos $(\theta-\phi)$, and then adding 1 to the cosine function to produce $1+\text{Cos }(\theta-\phi)$.

The sine function is then divided by the augmented cosine function to produce $$\frac{\sin (\theta-\phi)}{1+\text{Cos }(\theta-\phi)}$$

This function is multipiled by 2 through amplifier K to produce the feedback signal $$f(Ec, Ee)=2 \text{ Tan} \left(\frac{\theta-\phi}{2}\right)$$

An equivalent circuit for producing a feedback signal $$2 \text{ Tan} \frac{(\theta-\phi)}{2}$$

would provide for the subtraction $1-\text{Cos }(\theta-\phi)$ and then would divide the diminished cosine function by the sine function to produce the function $$\tan \frac{\theta-\phi}{2}=\frac{1-\text{Cos }(\theta-\phi)}{\text{Sin }(\theta-\phi)}$$

Other techniques for deriving the tangent of one-half the phase difference angle will be apparent from this example.

Figure 3:
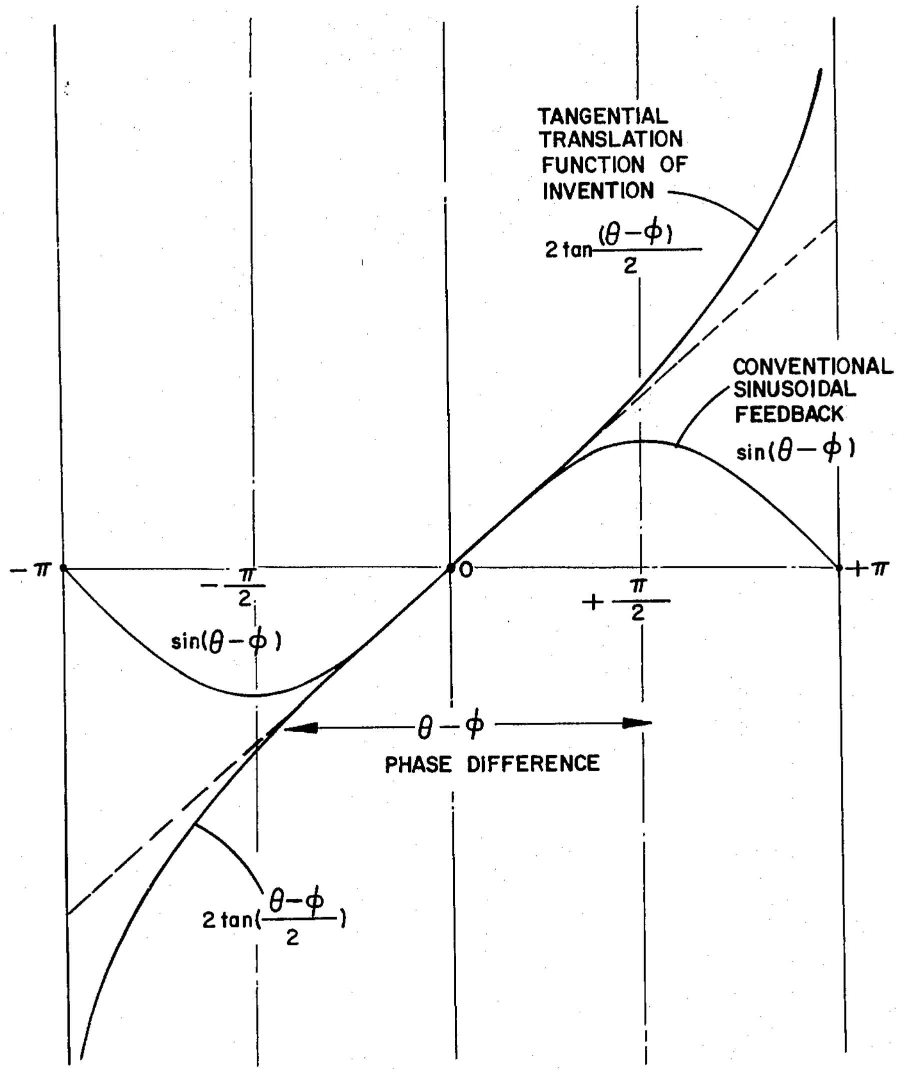
FIG. 3 is a chart which illustrates how the approach of the invention makes it possible to extend the linear feedback range for control and to extend the area of locking.

The reason for the improved operation of the invention will become apparent in discussing the tangential translation function shown in FIG. 3. It will be noted here that as the conventional sinusoidal feedback function approaches a phase difference of $+\pi/2$ radians (90°) the rate of feedback change begins to decrease. Then, as the phase difference begins to exceed $\pi/2$ the feedback change becomes negative for increasing phase difference so that the receiver would fall out of lock.

The tangent function, on the other hand, increases monotonically, approaching an infinite value at $\pi$ radians. It will also be noted that the linear region of the tangent translation function is substantially larger than that of the sinusoidal, being, in fact almost a 100 percent improvement.

The reason for this improvement in linearity can be observed by analyzing the approximate error functions for sin X and $$2 \tan \frac{x}{2}$$

as follows:

$$X-\text{ Sin } X=\frac{X^3}{6}-\frac{X^5}{120}+\frac{X^5}{5040}+\ldots$$

Non-linear error terms $$X-2 \tan \frac{X}{2}=\frac{X^3}{12}-\frac{X^5}{120}-\frac{17X^7}{64\times 315}+\ldots$$

It will be noted that the largest error term is the $X^3$ term in each case. The tangent error, however, is about one half that of the sinusoid if the higher order components are neglected.

Figure 4:
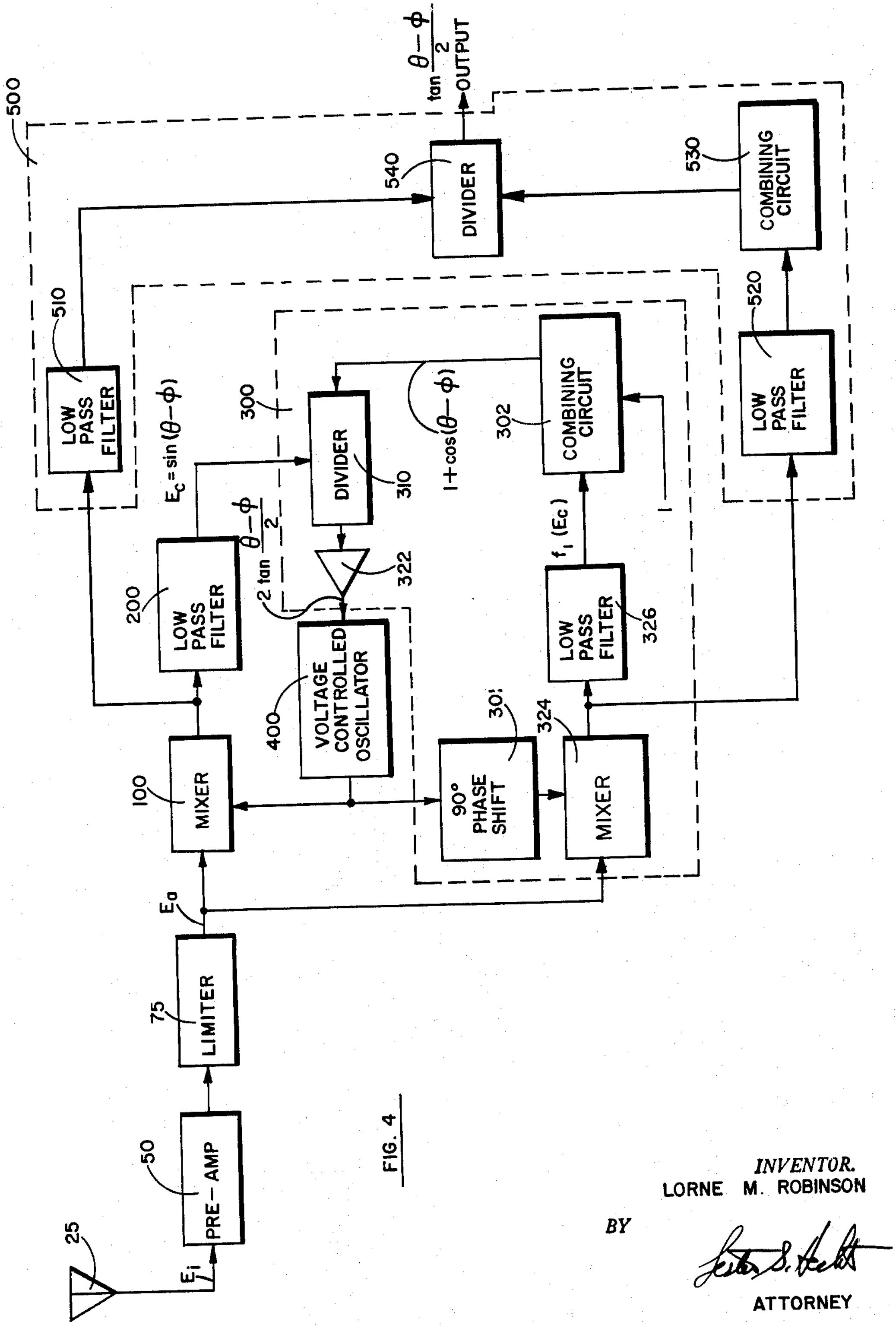
FIG. 4 is a block diagram of another receiver system incorporating the invention.

Reference is now made to FIG. 4 where a system incorporating the invention is shown using the tangential modification both of the feedback control of oscillator VCO and for developing an output signal with an extended linear range as a function of the phase difference.

As in the general arrangement of FIG. 1 an antenna 25 receives carrier input signals E$i$ which are applied to preamplifier 50 producing output signal E$a$ which is then applied to multiplier or mixer 100. Multiplier or mixer 100 also receives as input, as before, the output of VCO oscillator 400.

In the arrangement of FIG. 4 the phase shift circuit 301, which is also used in FIG. 2, is employed in a different connection by shifting the signal produced by VCO oscillator 400 and using it then to mix in a multiplier or mixer stage 324 with carrier signal E$a$. The output of multiplier 324 is then applied to a low-pass filter 326 which develops a signal referred to as $f1(Ec)$. This, in the particular case of FIG. 4 is Cos $(\theta-\phi)$. Since a tangential feedback control is desired in this arrangement the value of 1 is added through summing or combining circuit 302 to develop function $1+\text{Cos }(\theta-\phi)$ which is applied to divider circuit 310 which also receives signal E$c$, in this case being the same as Sin $(\theta-\phi)$. The output of divider 310 is passed through amplifier K, which is also referenced as 322, which develops the feedback control signal $$2 \tan \frac{\theta-\phi}{2}$$

which is applied to VCO oscillator 400.

The arrangement of FIG. 4 illustrates the general manner in which the tangential linear range extension principle of the invention may be employed to develop an output signal as well as a feedback control signal. A circuit 500 is arranged for this purpose which includes a low-pass filter 510 for receiving the output of multiplier or mixer 100 and a second low-pass filter 520 which receives the output of multiplier 324. Low-pass filter 520 is coupled to a summing or combining circuit 530 which has the same function as circuit 302 and receives the fixed value signal having the value of 1 in this example. This output signal then is applied to a divider 540 which receives the output of low-pass filter 510 and develops the tangential output as desired. Since the arrangement of FIG. 4 shows a manner of developing the cosine function by usage of the signal of VCO oscillator 400 rather than the signal of low-pass filter 200, it should be apparent that the generic concept of the invention includes any translation and function of the sinusoid signal E$c$ whether it is developed directly from the signal or from other signals having the same relationship.

Figure 5:
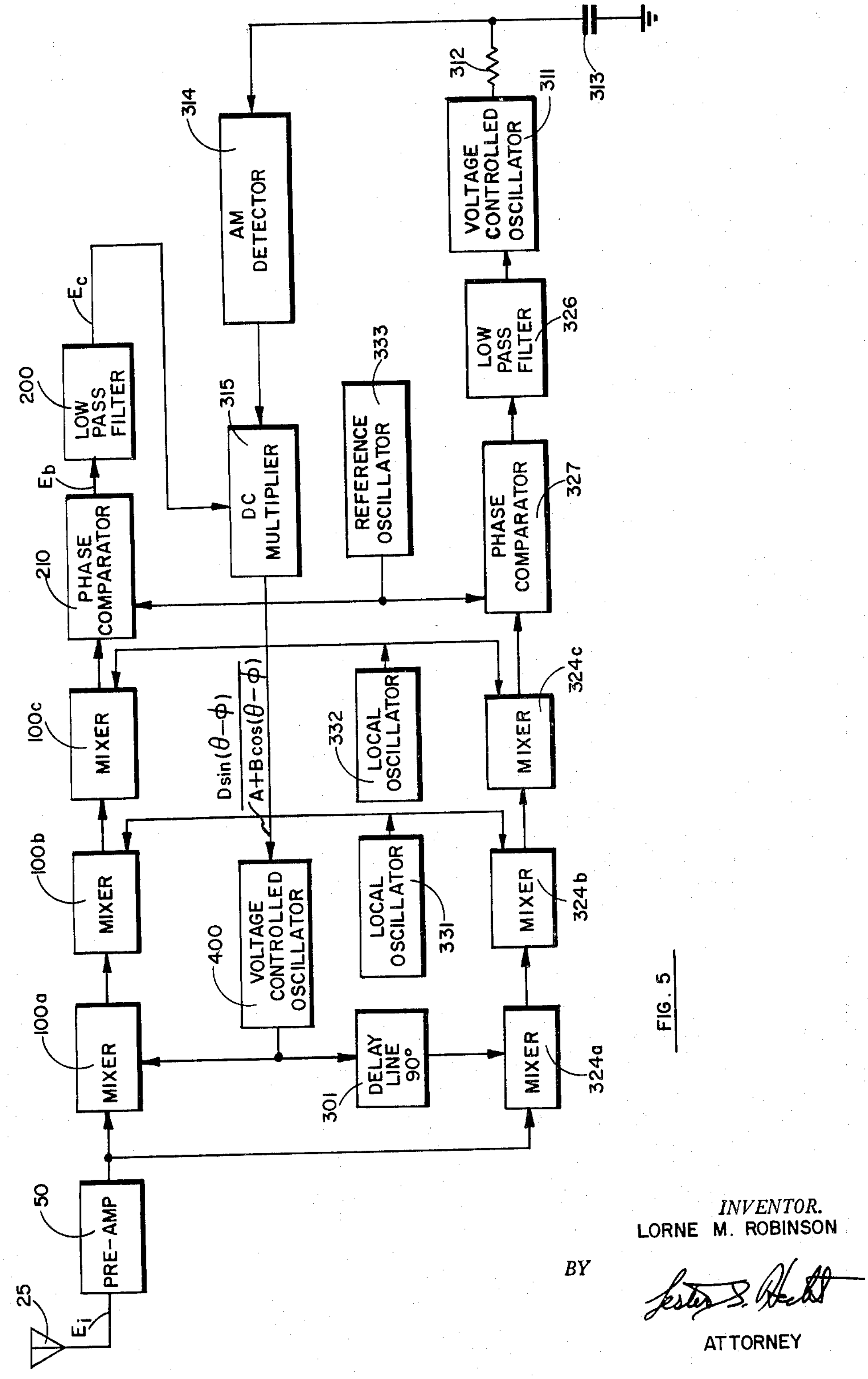
FIG. 5 is a block diagram of the preferred embodiment of the invention.

Reference is now made to FIG. 5 where an alternative embodiment of the invention is shown. As before the carrier input signal E$i$ is received by an antenna 25 and is passed through a pre-amplifier 50 to multiplier stage 100. In this example, multiplier 100 comprises three mixer stages 100A, 100B, and 100C in series. It will also be understood that the terms multiplier, mixer, or modulator may be utilized interchangeably herein to connote the same type of circuit wherein a local oscillator 400 is combined with a carrier modulator signal to develop an intermediate output signal. As in the arrangement of FIG. 4 VCO oscillator 400 is also connected to delay line 301 which provides a phase shift for the signal applied to mixer 324$a$ corresponding to 324 of FIG. 4. This provides an output signal which is further mixed in stage 324$b$ receiving the signal from local oscillator 331 which also provides a signal mixed in mixer **100*b*. The third mixing operation is accomplished in stage 324*c* which receives a signal from local oscillator 332, the output of which is also applied to 100*c***. The purpose of the plurality of the mixer stages is to enhance the image rejection capabilities of the receiver.

The mixed signals produced by stage **100*c* and 324*c* are applied to respective phase comparators 210 and 327 which receive the reference frequency of oscillator 333. Comparators 210 and 327 produce output signals in a well known manner corresponding to the low frequency components, proportional to the sine and cosine of the phase error, which are to be used in developing the feedback control signal. The desired signal bandwidth is derived through filters 200 and 326 for phase comparators 210 and 327**, respectively.

The signal derived through low-pass filter 326 is applied to a voltage controlled oscillator 311 which is designated as including summing circuit 302. This is so because the operating conditions of oscillator 311 are adjusted so that its center frequency or reference level includes the fixed value which is to be added to its signal. That is if the oscillator frequency swing were 100 c.p.s. per volt and its center frequency was offset by 100 c.p.s. from the value required to yield 0 volts output from AM detector 314 (see below) then the oscillator would have the effect of adding 1 to its oscillating signal. The output of oscillator 311 is then applied to a resistor 312 and capacitor 313 which result in an output signal whose amplitude is proportional to the reciprocal of the frequency of the output of VCO 311. Capacitor 313 develops a signal which is a function of 1 over $2\pi f$ which means as the frequency of oscillator 311 is increased the signal value developed across capacitor 313 is decreased. This reciprocal function signal developed across capacitor 313 is applied to amplitude detector circuit 314 resulting in a voltage proportional to the inverse of one plus VCO 311 input and controls the multiplication operation of D.C. multiplier 315 receiving the signal derived through filter 200. This then develops an output signal which is in the general functional form of $$\frac{D \text{ Sin } (\theta-\phi)}{A+B \text{ Cos } (\theta-\phi)}$$

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a receiver system wherein a carrier input signal modulated by lower frequency information signals is passed through an intermediate mixing stage controlled by a variable frequency oscillator to produce an intermediate frequency output which is a substantially sinusoidal function of phase difference of said input signal and a signal from said oscillator, the improvement in feedback control to said variable frequency oscillator comprising: a translation circuit having first means for receiving and phase shifting the lower frequency information signals passed through said intermediate mixing stage, second means for receiving and combining an external function signal with said phase shifted signals, and dividing means for combining a function of said lower frequency information signals with a function of said combined external function and phase shifted signals to produce a control function signal having a tangential relationship to said phase difference, said control function signal being applied to said variable frequency oscillator to effect substantially linear control thereof.

2. In a receiver system wherein the operation of a multiplier stage producing a signal E*b* is controlled by an oscillator having a variable frequency output which may be changed in frequency in response to a variable signal level input, the improvement in phase control comprising: phase shift means for receiving a signal E*c* corresponding to the information portion of signal E*b* and for producing a first translated signal bearing a predetermined relationship to signal E*b*; second means for receiving an input signal E*e* and for combining signal E*e* with said first translated signal to produce a second translated signal E*f*; and divider means responsive to signals E*c* and E*f* for producing a signal for controlling said oscillator.

3. In a system wherein a modulated carrier in the general form $\sin (wt+\theta)$ is combined with a local oscillator signal in the general form $\cos (wt+\phi)$ to produce an intermediate signal in the general form $$\tfrac{1}{2} [\sin (2wt+\theta+\phi)+\sin (\theta-\phi)]$$

and where the information portion $\tfrac{1}{2} \sin (\theta-\phi)$ of said intermediate signal is used to develop a frequency or phase control for said local oscillator, the improvement comprising: means for deriving a signal of the form $\cos (\theta-\phi)$ and combining therewith an input signal, and dividing means for deriving a control signal for the oscillator indicative of the quotient of said information portion and said combined signals, where $\theta$ is phase of the carrier and $\phi$ is phase of the control signal.

4. In a system wherein a modulated carrier in the general form $\sin (wt+\theta)$ is combined with a local oscillator signal in the general form $\cos (wt+\phi)$ to produce an intermediate signal in the general form $$\sin (2wt+\theta+\phi)+\sin (\theta-\phi)$$

and where the information portion in the general from $\sin (\theta-\phi)$ is used to develop a phase control signal for said oscillator the combination comprising: first means for producing a first modified information signal in the general form $A+B \cos (\theta-\phi)$; second means for forming a second modified signal having a reciprocal relationship to said first modified signal in the general form $$C/[A+B \cos (\theta-\phi)]$$

and third means for producing a control signal for said oscillator in the general form $$D \sin (\theta-\phi)/[A+B \cos (\theta-\phi)]$$

where $\theta$ is phase of the carrier, $\phi$ is phase of the control signal, and A, B, C, and D are constants.

5. An improved phase-lock receiver system comprising: a first multiplier stage for receiving an input signal; a voltage controlled oscillator for actuating said first multiplier stage to produce a first output signal; a first signal translator for producing a first modified signal as a function of the first output signal; a second signal translator for receiving an external input signal and said first modified signal to produce a second modified signal; and a third signal translator for producing a third modified signal for controlling said voltage controlled oscillator, said third translator including means for producing the product of the reciprocal of one of said first output and second modified signals and the non-reciprocal of the other of said first output and second modified signals.

6. An improved phase lock receiver comprising: a mixer; a voltage controlled oscillator; first means coupled to said voltage controlled oscillator for producing a phase shifted signal corresponding thereto; second means for adding a predetermined value to said phase shifted signal to produce a first modified signal; third means responsive to said first modified signal for producing a second modified signal bearing a reciprocal relationship to said first modified signal; and means for forming a product control signal as a function of said second modified signal and the output signal of said mixer.

7. An improvement in control for a frequency or phase locking system, said improvement comprising: first means for producing a sinusoidal output signal E*c*; second means for combining said output signal with a fixed value signal E*e*; and translating means including said signal E*e* for translating said signal $E_c$ into a tangential function to produce a tangential feedback control signal having an extended range of linearity.

8. The improvement defined in claim 7 wherein said signal $E_c$ is in general expressible as $A \sin(\theta-\phi)$, signal $E_e$ has a value of B, and said translating means includes means for computing said tangential control signal in accordance with the expression $$A \sin(\theta-\phi)/[B+D \cos(\theta-\phi)]$$

where $\theta$ is the phase of an input to the systems, $\phi$ is the phase of the feedback control signal and A, B and D are constants.

9. The improvement defined in claim 7 wherein said signal $E_c$ is expressible as $H \sin(\theta-\phi)$, signal $E_e$ has a value of H, and said translating means includes means for computing said tangential control signal in accordance with the expression $$[F-G \cos(\theta-\phi)]/H \sin(\theta-\phi)$$

where $\theta$ is the phase of the input to the systems, $\phi$ is the phase of the control signal, and F, G and H are constants.

10. The improvement defined in claim 7 wherein signal $E_c$ is expressible as $\sin(\theta-\phi)$, signal $E_e$ has a value of 1, and said translating means includes means for computing said tangential control signal in accordance with the expression $$2 \sin(\theta-\phi)/[1+\cos(\theta-\phi)]=2 \tan\frac{\theta-\phi}{2}$$

where $\theta$ is the phase of the input to the system and $\phi$ is the phase of the control signal.

11. A phase lock receiver comprising:
means for receiving an input signal,
a variable frequency oscillator under control of a feedback signal,
mixer means responsive to said receiving means and to said oscillator for providing a phase signal bearing a non-linear relation to the phase difference between said input and feedback signals,
translation circuit means for translating said phase signal into a substantially tangential function of said phase difference to produce said feedback signal, and
means responsive to said translation circuit means for controlling the oscillator according to the feedback signal.

12. A phase lock receiver comprising:
means for receiving an input signal,
a variable frequency oscillator,
mixer means responsive to said receiving means and to said oscillator for providing an intermediate frequency signal,
a quadrature phase shifter responsive to said mixer,
a dividing circuit having inputs derived from said phase shifter and mixer means, and
means for controlling the frequency of the oscillator in response to the output of the dividing circuit.

13. A phase lock receiver comprising:
means for receiving an input signal,
a variable frequency oscillator,
a first mixer responsive to said input signal and said oscillator,
a phase shifter responsive to said oscillator,
a second mixer responsive to said input signal and said phase shifter,
dividing circuit means responsive to the output of the first mixer and an augmented function of the output of the second mixer for providing a feedback signal, and
means for controlling the oscillator in response to said dividing circuit means.

14. A phase lock receiver comprising:
means for receiving an input signal,
a variable frequency oscillator,
a first mixer responsive to said input signal and said oscillator,
a phase shifter responsive to said oscillator,
a second mixer responsive to said input signal and said phase shifter,
a reference oscillator,
first and second phase comparators each having a first input from the reference oscillator,
means for applying the outputs of said first and second mixers as a second input to said first and second phase comparators, respectively,
computing circuit means for producing a control signal for the variable frequency oscillator as the product of the output of one of said phase comparators and the reciprocal of the output of the other of said phase comparators, and
means for controlling the oscillator in response to said computing circuit means.

15. For use with a phase lock receiver having a variable frequency oscillator, an extended linear range phase detection circuit for developing a control signal for the oscillator comprising:
a reference oscillator,
first and second phase comparators each having a first input from the reference oscillator,
first and second circuit means for applying a signal of unknown phase as a second input to said first and second phase comparators, respectively,
means for effecting a substantially 90° phase shift of one of said second inputs relative to the other, and
computing circuit means for producing a control signal for said variable frequency oscillator as the product of the output of one of said phase comparators and the reciprocal of the output of the other of said phase comparators,
said computing circuit means including means for combining a predetermined signal with one of said phase comparator outputs.

16. Means for extending the linear control range for a control signal comprising:
an oscillator,
first and second circuit means each having a first input from the oscillator and a second input, for providing first and second signals respectively indicative of the phase difference between the first and second inputs to said first and second circuit means,
means for effecting a 90° phase shift of one of the inputs of one of said circuit means,
means for combining a signal of predetermined magnitude with one of said first and second signals, and
computing circuit means for producing an extended linear range control signal according to the ratio of one of said first and second signals to the other.

References Cited by the Examiner

UNITED STATES PATENTS

| | | | |
|---|---|---|---|
| 2,481,659 | 9/49 | Guanella | 331—12 |
| 2,836,712 | 5/58 | Crosby | 250—20.36 |
| 2,946,884 | 7/60 | Mraz | 250—20.36 |
| 2,997,577 | 8/61 | Kaminski | 325—423 |

DAVID G. REDINBAUGH, *Primary Examiner.*

SAMUEL B. PRITCHARD, *Examiner.*